United States Patent

Roth et al.

[11] Patent Number: 5,937,437
[45] Date of Patent: Aug. 10, 1999

[54] METHOD AND APPARATUS FOR MONITORING ADDRESS TRANSLATION PERFORMANCE

[75] Inventors: Charles P. Roth; Frank E. Levine, both of Austin, Tex.

[73] Assignee: International Business Machines Corporation, Armonk, N.Y.

[21] Appl. No.: 08/738,748

[22] Filed: Oct. 28, 1996

[51] Int. Cl.⁶ .............................. G06F 12/00; G06F 11/30
[52] U.S. Cl. .............. 711/202; 395/184.01; 395/183.01; 395/185.01; 364/550; 364/551.01
[58] Field of Search ................................... 711/203, 206, 711/207, 215, 216, 221, 201, 126, 202; 395/184.01, 183.01, 185.01, 180, 838; 364/551.01, 550, 551.1

[56] References Cited

U.S. PATENT DOCUMENTS

| 5,123,101 | 6/1992 | Sindhu ..................................... 395/400 |
| 5,155,825 | 10/1992 | Moughanni et al. .................... 395/425 |
| 5,164,969 | 11/1992 | Alley et al. ................................ 377/39 |
| 5,448,705 | 9/1995 | Nguyen et al. ........................... 395/375 |
| 5,481,685 | 1/1996 | Nguyen et al. ........................... 395/375 |
| 5,485,625 | 1/1996 | Gumkowski .............................. 365/227 |
| 5,557,548 | 9/1996 | Gover et al. ......................... 364/551.01 |
| 5,657,253 | 8/1997 | Dreyer et al. ........................ 364/551.01 |
| 5,675,729 | 10/1997 | Mehring .............................. 395/183.13 |
| 5,727,167 | 3/1998 | Dwyer et al. ............................. 395/280 |
| 5,748,855 | 5/1998 | Levine et al. ....................... 395/800.23 |

OTHER PUBLICATIONS

Hennessy & Patterson, "Computer Architecture A Quantitative Approach", 2nd Ed., pp. 384, 422–447, Jan. 1996.

*Primary Examiner*—Eddie P. Chan
*Assistant Examiner*—Kimberly Nicole McLean
*Attorney, Agent, or Firm*—Anthony V.S. England; Daniel E. Venglarik; Andrew J. Dillon

[57] ABSTRACT

Effective-to-real address translation performance in a processor is monitored by counting selected events significant to evaluation of effective-to-real address translation in the processor to identify effective-to-real address translation bottlenecks. At least one performance monitor counter, the operation of which is controlled by a monitor mode control register, is embedded in the processor to noninvasively perform such counting. Examples of the events counted may include translation lookaside buffer misses, page table walks, or page table walk duration, taken alone or in any combination. Events lasting longer than a predetermined threshold, such as stalls lasting longer than two processor cycles, may also be selectively counted.

14 Claims, 6 Drawing Sheets

METHOD AND APPARATUS FOR MONITORING ADDRESS TRANSLATION PERFORMANCE

BACKGROUND OF THE INVENTION

1. Technical Field

The present invention relates in general to performance monitoring and in particular to performance monitoring of virtual memory address translations. Still more particularly, the present invention relates to monitoring the performance of multi-hierarchical address translation in a processing system.

2. Description of the Related Art

In typical computer systems utilizing processors, system developers desire optimization of execution software for more effective system design. Usually, studies of a program's access patterns to memory and interaction with a system's memory hierarchy are performed to determine system efficiency. Understanding the memory hierarchy behavior aids in developing algorithms that schedule and/or partition tasks, as well as distribute and structure data for optimizing the system.

Performance monitoring is often used in optimizing software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. The information produced usually guides system architects toward ways of enhancing performance of a given system or of developing improvements in the design of a new system.

Current approaches to performance monitoring include the utilization of test instruments. Unfortunately, this approach is not completely satisfactory. Test instruments can be attached to the external processor interface, but these instruments cannot determine the nature of internal operations of a processor. Test instruments attached to the external processor interface cannot distinguish between instructions executing in the processor. Test instruments designed to probe the internal components of a processor are typically considered prohibitively expensive because of the difficulty associated with monitoring the many busses and probe points of complex processor systems that employ out of order execution, multiple pipelines, branch pre-detection, instruction prefetching, data buffering, and more than one level of memory hierarchy within the processors. A common approach for providing performance data is to change or instrument the software. This approach however, significantly affects the path of execution and may invalidate any results collected. It is known that in most processing systems, modification of the software significantly affects the path of execution of the processing system. Consequently, software accessible counters are incorporated into processors. Most software accessible counters, however, are limited in the amount of granularity of information they provide.

Further, a conventional performance monitor is usually unable to capture machine state data until an interrupt is signaled. Consequently, results may be biased toward certain machine conditions that are present when the processor allows interrupts to be serviced. Also, interrupt handlers may cancel some instruction execution in a processing system where, typically, several instructions are in progress at one time. Further, many interdependencies exist in a processing system, so that in order to obtain any meaningful data and to profile the state of the processing system must be obtained at the same time across all system elements. Accordingly, control of the sample rate is important because this control allows the processing system to capture the appropriate state. It is also important that the effect that the previous sample has on the sample being monitored is negligible to ensure the performance monitor does not affect the performance of the processor. Accordingly, a need exists for a system and method for effectively monitoring processing system performance that will efficiently and noninvasively identify potential areas for improvement.

In particular, in systems supporting virtual memory storage, a need exists for a method of monitoring the performance of effective-to-real address translations. Address translation performance information could be utilized to identify processing bottlenecks, to determine if processor resources are sufficient to support operation of a particular software program, and to determine what modifications to a software program's operation could improve efficiency. Such information may also be utilized during design of future processors to improve performance.

SUMMARY OF THE INVENTION

It is therefore one object of the present invention to provide a method and apparatus for performance monitoring.

It is another object of the present invention to provide a method and apparatus for performance monitoring of virtual memory address translations.

It is yet another object of the present invention to provide a method and apparatus for monitoring the performance of multi-hierarchical address translation in a processing system.

The foregoing objects are achieved as is now described. Effective-to-real address translation performance in a processor is monitored by counting selected events significant to evaluation of effective-to-real address translation in the processor to identify effective-to-real address translation bottlenecks. At least one performance monitor counter, the operation of which is controlled by a monitor mode control register, is embedded in the processor to noninvasively perform such counting. Examples of the events counted may include translation lookaside buffer misses, page table walks, or page table walk duration, taken alone or in any combination. Events lasting longer than a predetermined threshold, such as stalls lasting longer than two processor cycles, may also be selectively counted.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
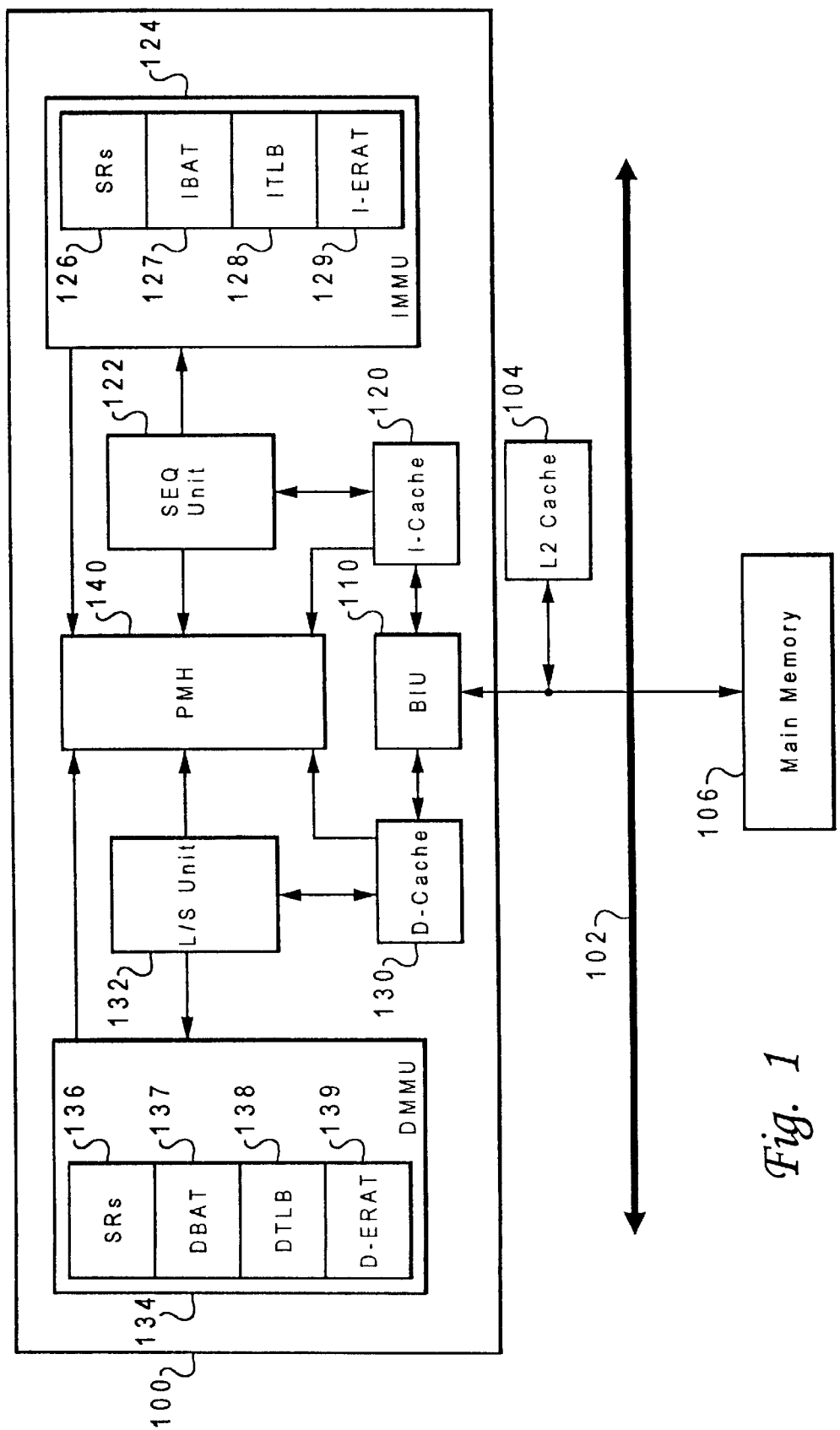
FIG. 1 depicts a processor and related portions of a data processing system in which a preferred embodiment of the present invention may be implemented.

With reference now to the figures, and in particular with reference to FIG. 1, a processor and related portions of a data processing system in which a preferred embodiment of the present invention may be implemented are depicted. Processor 100 is a single integrated circuit superscalar microprocessor, such as the PowerPC™ processor available from IBM Corporation, Austin, Tex. Accordingly, processor 100 includes various units, registers, buffers, memories, and other sections, all of which are formed by integrated circuitry. Processor 100 also operates according to reduced instruction set computing ("RISC") techniques.

As shown in FIG. 1, processor 100 is connected to system bus 102 and to a level two cache ("L2 cache") 104. Through system bus 102, processor 100 is also connected to main memory 106. System bus 102 is connected to a bus interface unit ("BIU") 110 of processor 100. BIU 110 controls the transfer of information between processor 100 and system bus 102. BIU 110 is connected to an instruction cache ("I-Cache") 120 and to a data cache ("D-Cache") 130 in processor 100 such as a floating point unit or a fixed point unit (not shown). Instruction cache 120 outputs instructions to a sequencer unit ("SEQ Unit") 122. In response to such instructions from instruction cache 120, sequencer unit 122 selectively outputs instructions to other execution circuitry of processor 100. Data cache 130 is a level one cache which may be accessed by processor 100 through load/store unit ("L/S Unit") 132.

Both instruction cache 120 and data cache 130 have associated memory management units ("IMMU" and "DMMU") 124 and 134. Memory management units 124 and 134 each comprise segment registers ("SRs") 126 and 136, block address translation facilities ("IBAT") 127 and ("DBAT") 137, translation lookaside buffers ("ITLB") 128 and ("DTLB") 138, and Effective to Real Address Translation (ERAT) buffer ("I-ERAT") 129 and ("D-ERAT") 139. ERAT buffers 129 and 139 perform the cache directory function of keeping recently used effective-to-real address translations on a cache line basis. ERAT buffers 129 and 139 may be accessed to quickly obtain a real address for use in verifying a cache hit. Translation lookaside buffers (TLBs) 128 and 138 keep translations of virtual addresses (the effective address with any offset such as a Segment offset) to real addresses on a page basis.

Instruction cache 120, data cache 130, sequencer unit 122, load/store unit 132, and memory management units 124 and 134 each provide signals to performance monitoring hardware 140. Performance monitoring hardware ("PMH") 140 provides facilities for monitoring and counting critical events related to virtual storage (effective-to-real) address translation. In particular, the performance monitoring hardware can monitor various aspects of ERAT operation, TLB operation, and the like. Such information is significant to the performance of effective-to-real address translation in a processing system due to the disparity in the number of processor cycles required to complete the translation. The ERAT is a circuit which converts recently used virtual addresses to corresponding real addresses in approximately ½ processor cycles. The TLB is a table in which effective-to-real address translation is more complicated, requiring calculation of the real address and approximately two processor cycles. A "page table walk" is a search of the cache using hashing algorithms which may take many processor cycles. While a page table walk is occurring, address translation is completely stalled. Thus, the performance of effective-to-real address translation can significantly affect the overall performance of a particular software program.

An example of an operation involving an hierarchical address translation to be monitored would be a "Store" instruction. The processor first accesses the ERAT to determine if the line to be stored is already in the cache. The ERAT may signal a miss, causing the processor to initiate a TLB access. The TLB may miss, resulting in a page table walk. The page table walk may miss, requiring the cache to fetch the line from main memory to the cache, evicting cache and TLB entries to enable a TLB translation for the store operation. The complex nature of identifying problems in effective-to-real address translation in such situations may be further complicated by the existence of multiple load/store operations.

In another example of the usefulness of performance monitoring hardware 140, a system employs segment tables, page tables, and multi-level address translation. In such a system, a TLB miss may result in a "page table walk," or sequentially looking for the page translation in a page table. The performance of the page table walk is dependent upon whether the pages are in the cache as well as the availability of the memory bus. Performance monitoring hardware 140 may be utilized to determine the number of virtual-to-real translations which miss the TLB and result in a page table walk, or to determine the "penalty" associated with incurring a page table walk.

Figure 2:
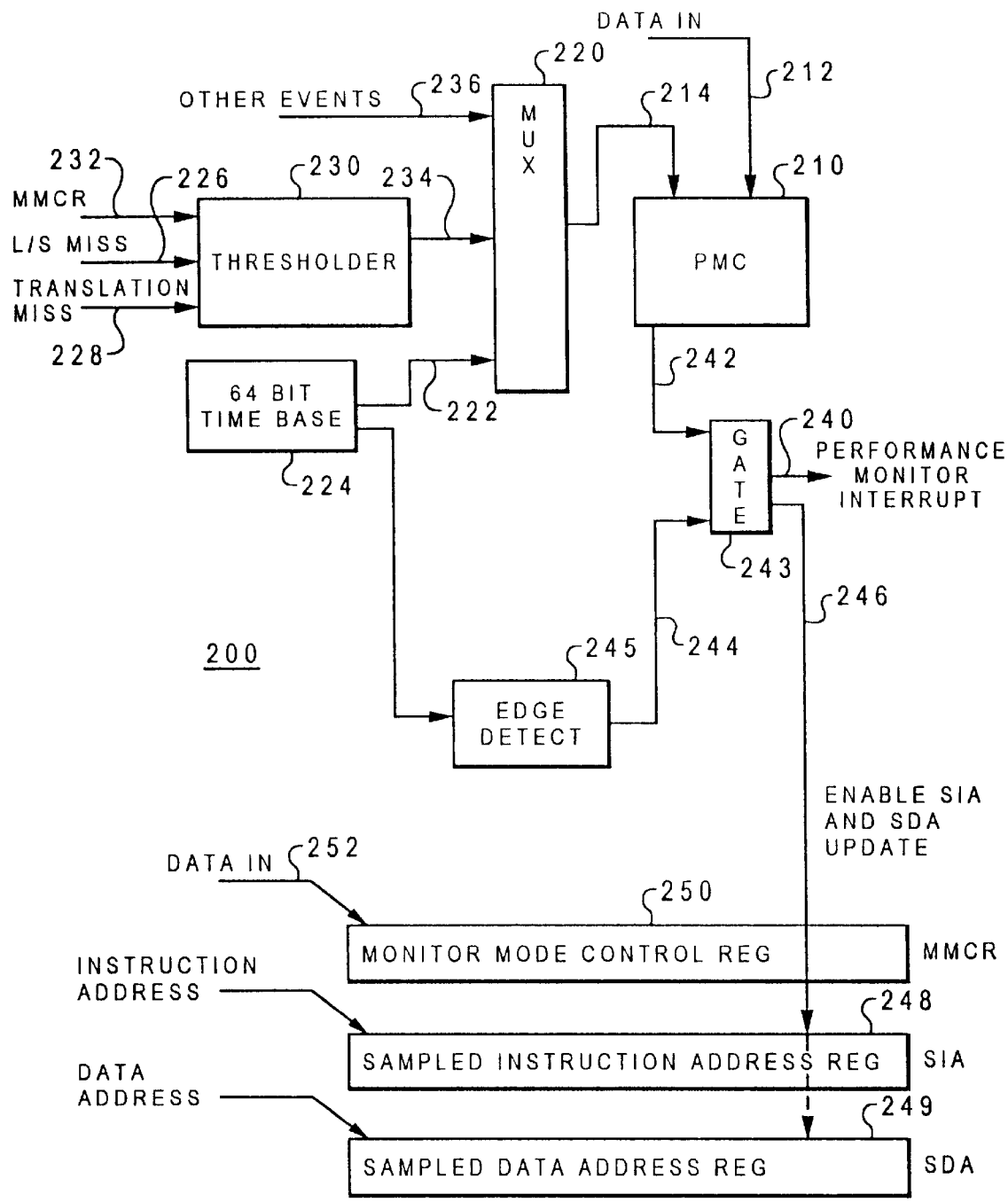
FIG. 2 is a performance monitor in accordance with a preferred embodiment of the present invention.

Referring now to FIG. 2, a performance monitor in accordance with a preferred embodiment of the present invention is illustrated. Performance monitor 200 includes performance monitor counter (PMC) 210, which counts events or cycles between events to provide performance analysis data. A signal line ("DATA IN") 212 is provided to allow initialization of the performance monitor counter to a desired value. The events to be counted by performance monitor counter 210 are supplied via a PMC event signal line 214 from multiplexor ("MUX") 220. Multiplexor 220 selectively passes events to performance monitor counter 210 to be counted.

The events to be counted by performance monitor counter 210 may alternatively be thresholded event signals. For example, a signal ("L/S miss") 226 indicating that the load/store unit is stalled may be supplied to thresholder 230. Another signal ("Translation miss") 228 may be supplied when an ERAT or TLB miss occurs. For as long as the selected event is occurring, thresholder 230 decrements an initial value received from the monitor mode control register ("MMCR") via data line 232. When the threshold is exceeded, the event is supplied by thresholder 230 as an input 234 to multiplexer 220, which may then pass the event to performance monitor counter 210 to be counted. Thresholder 230 thus allows the performance monitor to only monitor events which exceed a preselected value.

Multiplexor 220 may also pass events directly (i.e. without thresholding) to performance monitor counter 210 to be counted via signal line 236. The events to be counted may, if desired, be processor cycles, which are supplied to multiplexer 220 via signal line 236. When performance monitor counter 210 overflows, a performance monitor interrupt 240, which allows the user to access the count stored in the performance monitor, may be signalled via interrupt signal 242. Interrupt signal 242 is gated at gate 243 with a signal 244 from an edge detector 245 connected to time base facility 224.

Time base facility 224 includes a clock with a frequency that is typically based upon the system bus clock (i.e. at the frequency of the system bus clock or at some fraction such as ¼ of the system bus clock frequency) and is a required feature of a superscalar processor. By programming edge detector 245 to monitor a certain bit in time base facility 224, regular interrupts may be generated (i.e. in response to each flip of the monitored bit).

Unless masked, performance monitor interrupt 240 causes the machine state to be saved in special registers in the processor. In particular, the current instruction address and the current data address are saved in special registers, sampled data address register (SDA) 248 and sampled instruction address register (SIA) 249. Signal 246, issuing from the same gate 243 as performance monitor interrupt 240, enables an update of the contents of register SDA 248 and register SIA 249.

The operation of performance monitor 200, including the events tabulated by performance monitor counter 210, is selectively controlled by monitor mode control register ("MMCR") 250. An input signal ("DATA IN") 252 allows the contents of MMCR 250 to be modified to control the operation of performance monitor counter 210. MMCR 250 supplies an initial value to thresholder 230 for counting accumulated events. MMCR 250 also controls the source of events which are passed by multiplexer 220 to be counted by performance monitor counter 210.

Those skilled in the art will recognize that performance monitor 200 need not be implemented in the exact configuration depicted. Performance monitoring hardware may include a plurality of performance monitor counters controlled by only a few monitor mode control registers. For example, a processor may include 4–8 performance monitor counters under the control of only 1–2 monitor mode control registers.

Through information selectively accumulated by performance monitor counter 210 under the control of MMCR 250, performance monitor 200 can be utilized to scrutinize a variety of address translation functions, such as:

number of moves to BAT;
number of moves to segment registers;
number of D-Cache misses;
number of D-Cache misses that exceed a threshold value;
number of D-ERAT misses;
number of D-ERAT misses that exceed a threshold value;
number of I-ERAT misses;
number of I-ERAT misses that exceed a threshold value;
number of TLB queries;
number of TLB misses;
number of TLB misses that exceed a threshold value;
number of page table walk cycles;
number of page table walk cycles that exceed a threshold value;
number of data address translations completed;
number of instruction address translations completed;
number of D-ERAT flushes (invalidations); and
number of I-ERAT flushes (invalidations).

Based on these and other quantitative or qualitative measurements of address translation performance using performance monitoring hardware, one can evaluate address translation bottlenecks, evaluate the organization of ERAT buffers, determine whether the size of ERAT and TLB buffers are sufficient, determine whether a program could utilize BAT rather than page translation, and determine whether the instruction address translations and data address translations are interfering with one another.

Figure 3:
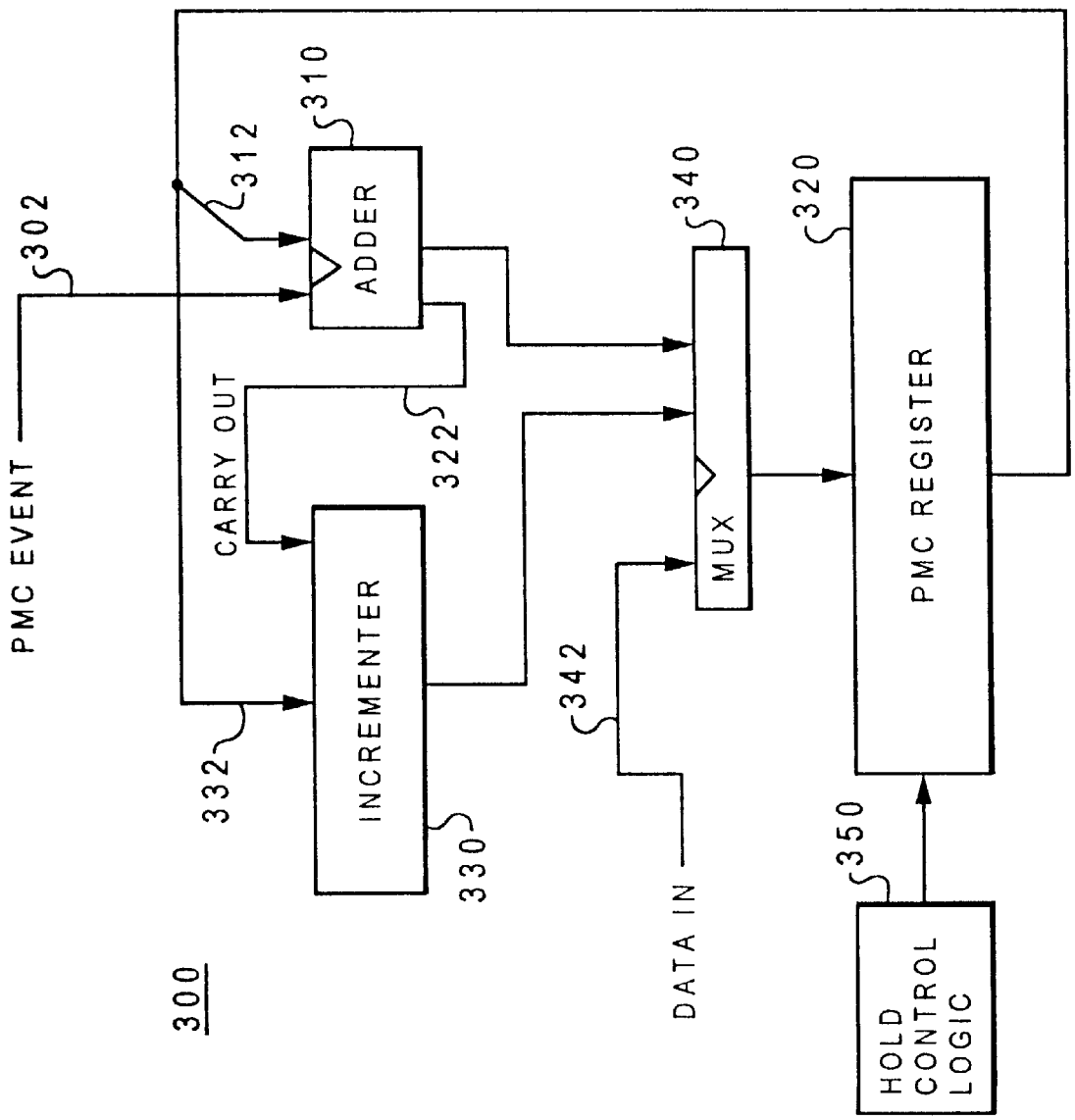
FIG. 3 depicts a performance monitor counter in accordance with a preferred embodiment of the present invention.

With reference now to FIG. 3, a performance monitor counter in accordance with a preferred embodiment of the present invention is depicted. Performance monitor counter 300 receives as an input a signal ("PMC Event") 302 indicative of the events to be counted. This signal is received into a low order adder 310. Adder 310 receives as another input a signal 312 from a register ("PMC Register") 320, which stores the current number of events counted by performance monitor counter 300. Each time an event to be counted occurs, adder 310 increments low-order bit of the value received from register 320. A carry out signal 322 from adder 310 steps a larger incrementer 330, which also receives an input 332 from register 320. Incrementer 332 and adder 312 pass the incremented count back to register 320 through multiplexer 340, so that the count maintained in register 320 may be updated. Multiplexer 340 may selectively pass an input signal ("Data in") 342 to register 320, providing a path to initiate register 320 with the value to be incremented by events counted. Hold control logic 350 provides clocking allowing performance monitor counter 300 to operate only at pre-determined processor states. That is, register 320 may be selectively controlled so that the count value is only effectively incremented (when register 320 is updated) by events occurring while the processor is in, say, a "Problem" state. In this manner performance monitor counter 300 may not only count events, but may selectively count events occurring while the processor is in a particular state.

Figure 4:
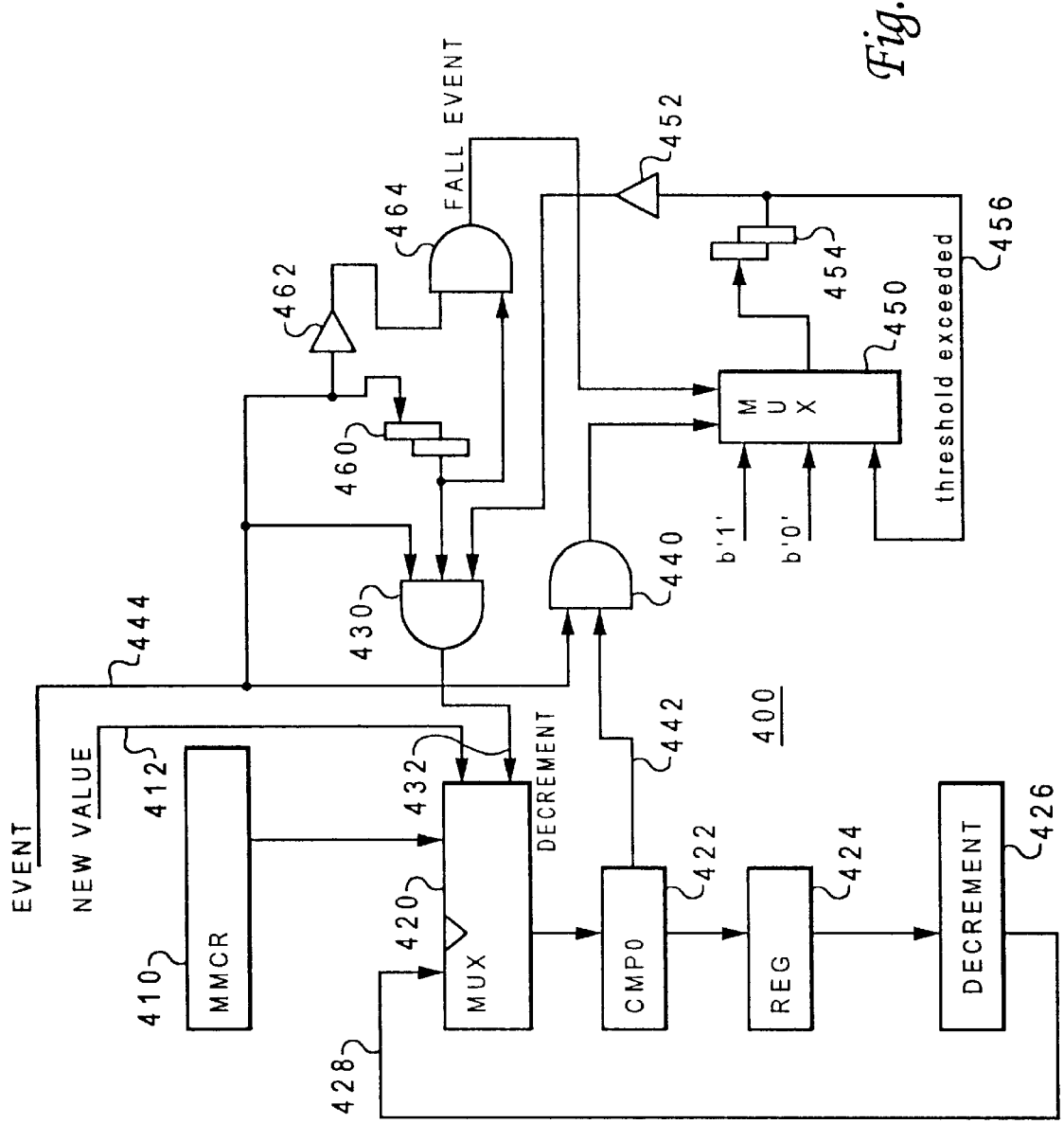
FIG. 4 is a thresholder in accordance with a preferred embodiment of the present invention.

Referring now to FIG. 4, a thresholder in accordance with a preferred embodiment of the present invention is illustrated. Thresholder 400 receives an input value to be decremented from MMCR 410. The input value is received by thresholder 400 at multiplexer 420 in response to a signal ("NEW VALUE") 412 indicated that thresholder 400 is to begin decrementing a new value. By default, when an event to be thresholded is not occurring multiplexer (MUX) 420 selects MMCR 410 and loads a new value to be decremented. The new value may then be decremented starting with the next processor cycle that the event to be thresholded is active. Once an event has been thresholded and passed to the performance monitor counter, thresholder 400 is again reinitialized by MMCR 410 to the new value to be decremented.

In a decrement cycle, multiplexer 420 passes the value to be decremented to comparator (CMPO) 422, which compares the value to zero. The value is then passed to register 424, which stores the present value of the value being decremented. The value is then passed to and decremented by decrementer (DECREMENT) 426, which passes the decremented value back to multiplexer 420 through input line 428. A DECREMENT signal 432 from AND gate 430 causes multiplexer 420 to pass the decremented value received at input 428 back through the decrement cycle described.

Comparator 422 conveys a signal 442 to AND gate 440, which receives as its other input a signal ("EVENT") 444 representative of the event to be thresholded. If the event to be thresholded is still occurring when the value to be decremented reaches zero, AND gate 440 will indicate that the threshold has been exceeded by causing multiplexer (MUX) 450 to select b'1'. After one processor cycle, the value of b'1' is passed through master-slave flip-flop 454, is then inverted by inverter 452, and is provided as an input to AND gate 430. In response, AND gate 430 will not provide decrement selection signal 432 to multiplexer 420. Thus AND gate 430 causes multiplexer 420 to select input signal 428 to be decremented only when the event to be thresholded is occurring during this processor cycle, occurred during the previous processor cycle, and the threshold has not been exceeded.

The falling edge of the event to be thresholded is recognized by master-slave flip-flop 460, inverter 462, and AND gate 464. Upon recognition of the falling edge of the event, AND gate 464 causes multiplexer 450 to select b'0'. By default, multiplexor 450 reselects threshold exceeded signal 456 passed from master-slave flip-flop 454, which holds the current value of threshold exceeded signal 456. The rising edge of threshold exceeded signal 454 is utilized by a performance monitor counter to increment a count. Thus, selection of b'0' upon recognition of the falling edge of the event effectively resets threshold exceeded signal 454.

Figure 5:
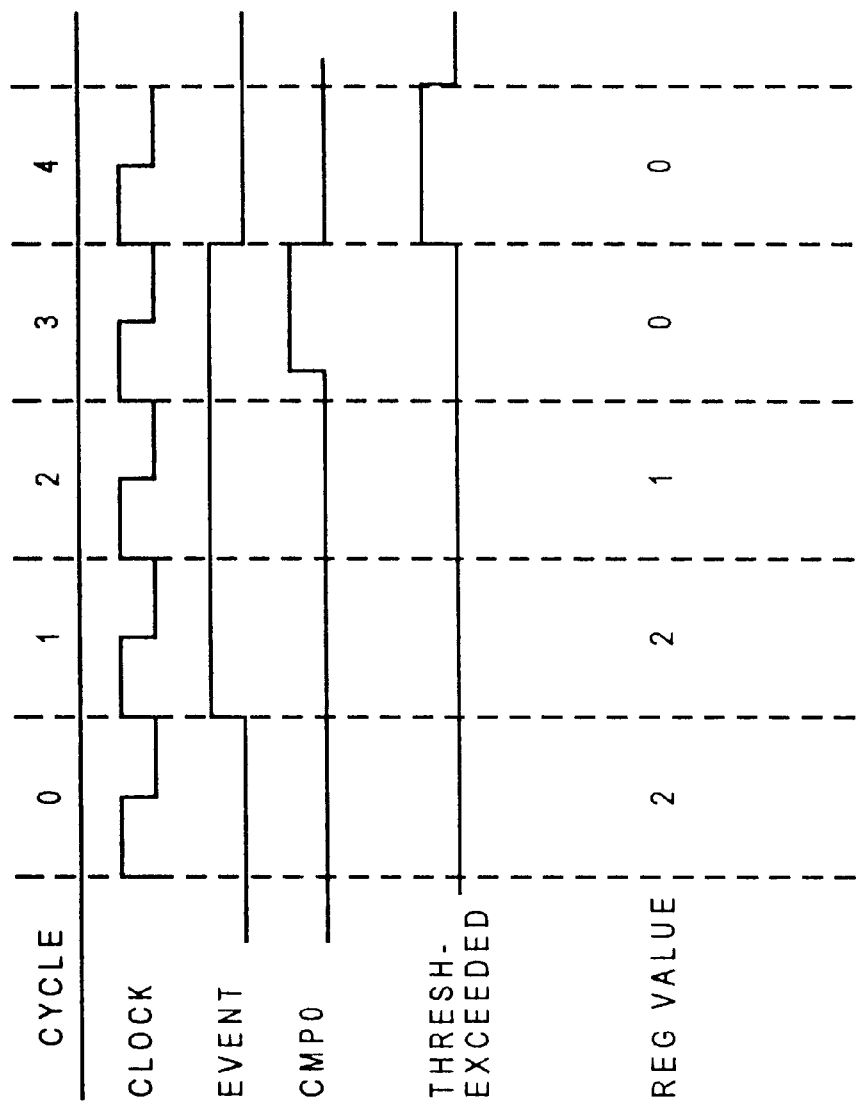
FIG. 5 depicts a sample timing diagram demonstrating the performance of a thresholder in accordance with a preferred embodiment of the present invention.

With reference now to FIG. 5, a sample timing diagram demonstrating the performance of a thresholder in accordance with a preferred embodiment of the present invention is depicted. The register value, obtained from the multiplexor, is set to an initial value of 2. As long as the event to be thresholded is active, the thresholder decrements the register value until it is zero. The threshold event is then passed to the performance monitor counter to be counted. In this manner, the performance monitor may measure activity which is more persistent than a specified value, such as a stalled cache access that lasts for longer than two processor cycles.

Figure 6:
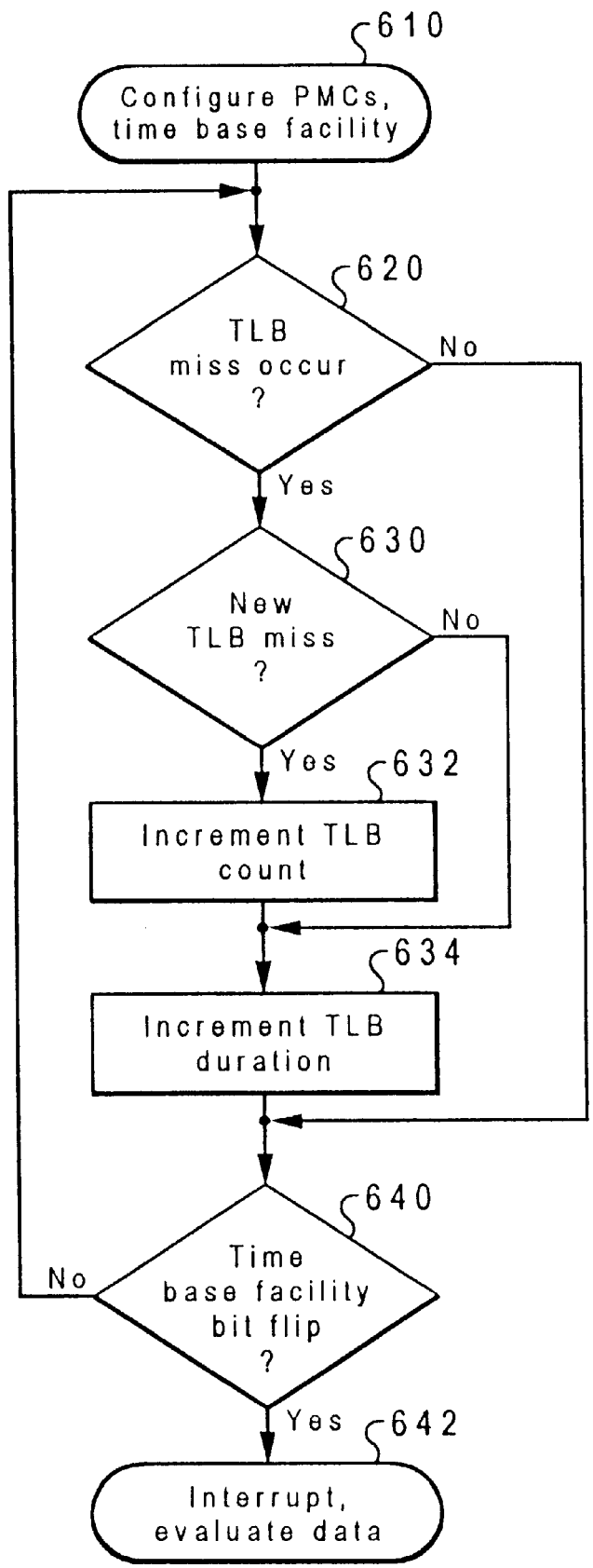
FIG. 6 is a high level flowchart for an example process using the performance monitoring hardware in accordance with a preferred embodiment of the present invention.

Referring now to FIG. 6, a high level flowchart for an example process using the performance monitoring hardware in accordance with a preferred embodiment of the present invention is illustrated. In the example shown, the performance monitoring hardware is utilized to determine the number of effective-to-real address translations which miss the TLB and result in a page table walk during a specified period. Steps 620 through 640 in the example shown in FIG. 6 depict the process during one processor cycle.

The process begins at step 610, which illustrates configuring the required performance monitor counters and the time base facility. In the example shown, two performance monitor counters are necessary: one to count TLB miss events, and one to count processor cycles during TLB miss events. The first performance monitor counter is configured to count events reflecting a TLB miss. The event selected as reflecting a TLB miss must be suitable for distinguishing each individual TLB miss, such as a specific memory management unit signal while the processor is in a specific state. The second performance monitor counter is configured to count processor cycles while an event selected as reflecting a TLB miss occurs. This performance monitor need not distinguish between TLB misses and therefore may utilize a different memory management signal as reflecting that a TLB miss is occurring. The time base facility is programmed to generate a timed interrupt when a specific bit changes value.

From step 610 the process passes to step 620, which depicts a determination of whether a TLB miss is occurring during the processor cycle examined. If so, the process passes to step 630, which illustrates a recognition of whether the TLB miss is a new TLB miss or a continuation of a prior TLB miss. If the TLB miss is new, the process passes to step 632, which depicts incrementing the TLB miss count, and then to step 634, which illustrates incrementing the TLB duration count. The process then proceeds to step 640, described below.

Referring back to step 630, if the TLB miss occurring during the processor cycle being examined were a continuation of a prior TLB miss, the process would proceed instead directly to step 634, which depicts incrementing the TLB duration count as described above. Again, the process proceeds next to step 640, as described below.

Referring back to step 620, if the events selected as reflecting a TLB miss are not occurring during the processor cycle being examined, the process passes instead directly to step 640. Step 640 illustrates a determination of whether the time base facility bit being monitored has flipped, indicating that the specified period has elapsed. If not, the process passes back to step 620 and steps 620 through 640 are repeated for the subsequent processor cycle. If the monitor time base facility bit has flipped, however, the process proceeds instead to step 642, which depicts interrupting the performance monitoring hardware and evaluating the data obtained by the process. For example, the number of TLB miss events counted by the first performance monitor and the cumulative number of processor cycles (duration) for all TLB miss events during the specified period counted by the second performance monitor may be utilized to calculate an "average" TLB miss penalty.

The invention described above provides processor designers with valuable information regarding the performance of a specific processor design in actual program environments requiring effective-to-real address translations. It also provides software developers with information necessary to optimize software performance for a given processor and manage resources in view of the processors effective-to-real address translation capabilities.

While the invention has been particularly shown and described with reference to a preferred embodiment, it will be understood by those skilled in the art that various changes in form and detail may be made therein without departing from the spirit and scope of the invention.

We claim:

1. A method of monitoring address translation performance in a data processing system, comprising:

selecting a duration threshold for a selected event significant to an evaluation of address translation in said processing system wherein said selected event is selected from a group consisting of events related to ERAT performance and page table walks;

counting a number of occurrences of said selected event which exceed said duration threshold to generate a count; and providing an interrupt signal in said processing system to allow a user access to said count.

2. The method of claim 1, wherein said step of counting a number of occurrences of said selected event which exceed said duration threshold further comprises counting events related to ERAT performance.

3. The method of claim 1, wherein step of counting a number of occurrences of said selected event which exceed said duration threshold comprises counting page table walks.

4. The method of claim 1, wherein said step of counting a number of occurrences of said selected event which exceed said duration threshold comprises counting events exceeding a threshold number.

5. An address translation performance monitor in a data processing system, comprising:

threshold means for selecting a duration threshold for a selected event significant to evaluation of address translation in said data processing system, wherein said selected event is selected from a group consisting of events related to ERAT performance and page table walks;

counting means for counting a number of occurrences within a selected period of said selected event exceeding said duration threshold to generate a count;

storing means for storing said count in a register in said data processing system; and interrupt means for providing an interrupt signal in said processing system to allow a user access to said stored count.

6. The monitor of claim 5, wherein said selected events are events related to ERAT performance.

7. The monitor of claim 5, wherein said selected events are page table walks.

8. The monitor of claim 5, wherein said counting means further comprises:

means for counting events exceeding a threshold number.

9. An address translation performance monitor in a data processing system, comprising:

a threshold unit setting a duration threshold for a selected event significant to evaluation of address translation performance in said data processing system, wherein said selected event is selected from a group consisting of events related to ERAT performance and page table walks;

at least one performance monitor counter counting a number of occurrences of said selected event which exceed said duration threshold to generate a count;

at least one register within said at least one performance monitor counter storing said count, said at least one register selectively accessible to a user; and an interrupt signal in said data processing system stopping said counting by said at least one performance monitor counter to allow access by said user to said at least one register.

10. The address translation performance monitor of claim 9 wherein said at least one performance monitor counter and said at least one register are contained within a processor in said data processing system.

11. The address translation performance monitor of claim 9, further comprising a multiplexer for selecting the selected events counted by said at least one performance monitor counter.

12. The address translation performance monitor of claim 9, further comprising a thresholding unit passing a portion of said selected events to said at least one performance monitor counter, said portion corresponding to said selected events which exceed a predetermined threshold value.

13. The address translation performance monitor of claim 9 wherein said at least one performance monitor counter further comprises hold control logic enabling said at least one performance monitor counter to count said selected events only when said data processing system is in a predetermined state.

14. The method of claim 1, wherein said step of selecting a duration threshold for a selected event significant to evaluation of address translation in said processing system further comprises:

selecting a duration threshold of two processor cycles.

* * * * *